US008884900B2

(12) United States Patent
Wassvik

(10) Patent No.: US 8,884,900 B2
(45) Date of Patent: Nov. 11, 2014

(54) TOUCH-SENSING DISPLAY APPARATUS AND ELECTRONIC DEVICE THEREWITH

(75) Inventor: Ola Wassvik, Brösarp (SE)

(73) Assignee: Flatfrog Laboratories AB, Lund (SE)

( * ) Notice: Subject to any disclaimer, the term of this patent is extended or adjusted under 35 U.S.C. 154(b) by 85 days.

(21) Appl. No.: 13/548,749

(22) Filed: Jul. 13, 2012

(65) Prior Publication Data

US 2013/0021300 A1    Jan. 24, 2013

Related U.S. Application Data

(60) Provisional application No. 61/507,164, filed on Jul. 13, 2011.

(51) Int. Cl.
*G09G 5/00* (2006.01)
*G06F 3/042* (2006.01)

(52) U.S. Cl.
CPC .... *G06F 3/0421* (2013.01); *G06F 2203/04109* (2013.01)
USPC ...... 345/173; 345/175; 178/18.01; 178/18.09

(58) Field of Classification Search
CPC ....... G06F 3/041; G06F 3/042; G06F 3/0421; G08C 21/00
USPC ..................... 345/173–178; 178/18.01–18.09
See application file for complete search history.

(56) References Cited

U.S. PATENT DOCUMENTS

| 7,042,444 | B2 | 5/2006 | Cok |
| 7,202,856 | B2 | 4/2007 | Cok |
| 7,432,893 | B2 | 10/2008 | Ma et al. |
| 7,613,375 | B2 * | 11/2009 | Shimizu ........................ 385/129 |
| 2004/0140960 | A1 | 7/2004 | Cok |
| 2004/0251821 | A1 | 12/2004 | Cok |

(Continued)

FOREIGN PATENT DOCUMENTS

| EP | 1471459 A2 | 10/2004 |
| EP | 2336859 A1 | 6/2011 |

(Continued)

OTHER PUBLICATIONS

Cornelissen et al. "Injecting Light of High-Power LEDs into Thin Light Guides", International Optical Design Conference 2010, vol. 7652, pp. 765212-1-965212-6, 2010.

(Continued)

*Primary Examiner* — Jennifer Nguyen
(74) *Attorney, Agent, or Firm* — Harness, Dickey & Pierce, P.L.C.

(57) ABSTRACT

A touch-sensing display apparatus comprises a display unit with integrated elements, and a planar light guide located in front of the display unit so as to define a touch surface. At least one light emitter is arranged to emit light into the light guide for propagation by total internal reflection inside the light guide, and at least one light detector is arranged to receive at least part of the light propagating inside the light guide. The integrated elements are designed as image-forming elements and touch-sensor elements, wherein the touch-sensor elements comprise the emitter(s) and/or the detector(s) and are arranged along a periphery region of the display unit. The image-forming elements and the touch-sensor elements may be integrated in one and the same composite substrate within the display unit.

25 Claims, 2 Drawing Sheets

(56) References Cited

U.S. PATENT DOCUMENTS

| | | |
|---|---|---|
| 2008/0074401 A1 | 3/2008 | Chung et al. |
| 2008/0121442 A1* | 5/2008 | Boer et al. ................. 178/18.09 |
| 2008/0150848 A1 | 6/2008 | Chung et al. |
| 2008/0284925 A1 | 11/2008 | Han |
| 2010/0079382 A1 | 4/2010 | Suggs |
| 2010/0097348 A1 | 4/2010 | Park et al. |
| 2010/0315379 A1* | 12/2010 | Allard et al. ................. 345/175 |
| 2011/0084939 A1 | 4/2011 | Gepner et al. |
| 2011/0199340 A1 | 8/2011 | Aikio et al. |
| 2011/0221705 A1 | 9/2011 | Yi et al. |
| 2011/0221997 A1 | 9/2011 | Kim et al. |
| 2011/0234537 A1 | 9/2011 | Kim et al. |
| 2012/0086673 A1* | 4/2012 | Chien et al. ................. 345/175 |
| 2012/0268427 A1 | 10/2012 | Slobodin |
| 2014/0071653 A1 | 3/2014 | Thompson et al. |

FOREIGN PATENT DOCUMENTS

| | | |
|---|---|---|
| WO | WO-2007058924 A2 | 5/2007 |
| WO | WO-2009077962 A2 | 6/2009 |
| WO | WO-2010064983 A2 | 6/2010 |
| WO | WO-2011068761 A1 | 6/2011 |

OTHER PUBLICATIONS

U.S. Office Action issued in U.S. Appl. No. 13/742,958, mailed Feb. 13, 2014.
International Search Report dated Dec. 4, 2013, issued in International Application No. PCT/SE2013/050330.
International Search Report dated Oct. 8, 2013, issued in International Application No. PCT/SE2013/050024.
U.S. Office Action issued in U.S. Appl. No. 13/742,958, dated Aug. 22, 2014.

* cited by examiner

TOUCH-SENSING DISPLAY APPARATUS AND ELECTRONIC DEVICE THEREWITH

CROSS-REFERENCE TO RELATED APPLICATIONS

The present application claims the benefit of U.S. provisional application No. 61/507,164, filed on Jul. 13, 2011, the entire contents of which are incorporated herein by reference.

TECHNICAL FIELD

The present invention relates to touch sensing systems and especially to display devices that offer touch sensitivity.

BACKGROUND ART

Display devices with touch sensitivity are used today in a wide variety of applications such as touch pads in laptop computers, all-in-one computers, mobile phones and other hand-held devices, etc. It is often a desire to provide these electronic devices with a relatively large touch sensing display and still let the devices be small and thin.

There are numerous techniques for providing a display device with touch sensitivity, e.g. by adding layers of resistive wire grids or layers for capacitive touch-sensing or by integrating detectors in the display device. The major drawback of these techniques is that they reduce the optical quality of the display device, by reducing the amount of light emitted from the display or by reducing the number of active pixels of the display device.

U.S. Pat. No. 7,432,893 discloses a touch sensing system that uses FTIR (frustrated total internal reflection) to detect touching objects. Light emitted by a light source is coupled into a transparent panel by a prism, then propagates inside the panel by total internal reflection where after the transmitted light is received at an array of light detection points. The light may be disturbed (frustrated) by an object touching the panel, whereby a decrease in transmitted light is sensed at certain light detection points. Providing a display device with this touch sensing system would add an undesired thickness and complexity to the display device.

WO2009/077962 also discloses a touch sensing system that uses FTIR to detect touching objects. Disclosed is a panel with a tomograph having signal flow ports adjacent the panel, the flow ports being arrayed around the border of the panel. Light is emitted into the panel by the flow ports and propagates inside the panel by total internal reflection where after the transmitted light is detected at a plurality of flow ports. The light may be disturbed by an object touching the panel. Providing a display device with this touch sensing system would add an undesired thickness and complexity to the display device.

SUMMARY

It is an object of the invention to at least partly overcome one or more of the above-identified limitations of the prior art.

Another objective is to reduce the required thickness for providing touch sensitivity to a display device.

A further objective is to provide touch sensitivity to a display device without significantly affecting the optical quality of the display device.

One or more of these objects, as well as further objects that may appear from the description below, are at least partly achieved by means of a touch-sensing display apparatus and an electronic device according to the independent claims, embodiments thereof being defined by the dependent claims.

A first aspect of the invention is a touch-sensing display apparatus. The touch-sensing display apparatus comprises a display unit comprising integrated elements, a planar light guide located in front of the display unit, so as to define a touch surface, at least one light emitter arranged to emit light into the light guide for propagation by total internal reflection inside the light guide and at least one light detector arranged to receive at least part of the light propagating inside the light guide. The integrated elements comprise image-forming elements and touch-sensor elements, and the touch-sensor elements comprise at least one of said at least one emitter and said at least one detector and are arranged along a periphery region of the display unit. In at least one embodiment, the integrated elements, including the image-forming elements and the touch-sensor elements, form a single integral structure where the image-forming elements and the touch-sensor elements are separated only functionally. In this example, the image-forming elements and the touch-sensor elements are not physically separated from one another.

A second aspect of the invention is an electronic device comprising the touch-sensing display apparatus of the first aspect. The electronic device further comprises a controller for causing the image-forming elements to display information content within a first part of the touch surface while causing the touch-sensor elements to provide touch sensitivity within a second part of the touch surface.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
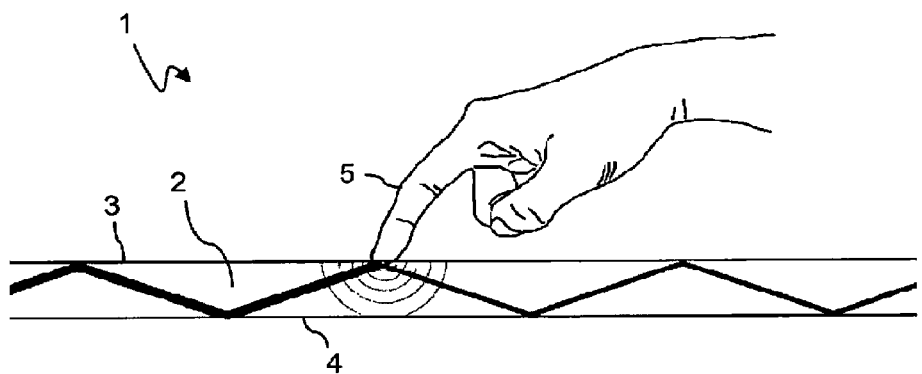
FIG. 1 is a side view of an object in contact with a light transmissive panel to illustrated the use of FTIR for touch sensing.

The present invention relates to the use of optical techniques, specifically FTIR, for providing touch sensitivity to a display apparatus. Example embodiments are presented in relation to two established display technologies: OLED and TFT-LCD. Throughout the description, the same reference numerals are used to identify corresponding elements.

FIG. 1 illustrates the operating principle of a touch-sensing FTIR system 1. In the side view of FIG. 1, a beam of light is propagated by total internal reflection (TIR) inside a planar (two-dimensional) light guide formed by a light transmissive panel 2. The panel 2 comprises opposing surfaces 3, 4 which define a respective boundary surface of the panel 1. Each boundary surface 3, 4 reflects light that impinges on the boundary surface from within the panel 1 at an angle that exceeds the so-called critical angle, as is well-known to the skilled person. When an object 5 is brought sufficiently close to one of the boundary surfaces (here, the top surface 3), part of the beam may be scattered by the object 5, part of the beam may be absorbed by the object 5, and part of the beam may continue to propagate in the panel by TIR in the incoming direction. Thus, when the object 5 touches the top surface 3, which forms a "touch surface", the total internal reflection is frustrated and the energy of the transmitted light is decreased, as indicated by the thinned lines to the right of the object 5. This phenomenon is known as FTIR (Frustrated Total Internal Reflection) and a corresponding touch-sensing device is referred to as an "FTIR system".

Although not shown in FIG. 1, the FTIR system 1 typically includes an arrangement of emitters and detectors, which are distributed along the periphery of the touch surface 3. Light from an emitter is introduced into the panel 2 and propagates by TIR to one or more detectors. Each pair of an emitter and a detector defines a "detection line", which corresponds to the propagation path from the emitter to the detector. Any object that touches the touch surface along the extent of the detection line will thus decrease or attenuate the amount of light received by the detector. The emitters and detectors are typically arranged to define a grid of intersecting detection lines on the touch surface, whereby each touching object is likely to cause an attenuation of several non-parallel detection lines.

The arrangement of detectors is electrically connected to a signal processor, which acquires and processes an output signal from the arrangement. The output signal is indicative of the power of transmitted light at each detector. The signal processor may be configured to process the output signal for extraction of touch data, such as a position (e.g. x, y coordinates), a shape or an area of each touching object.

Figure 2A:
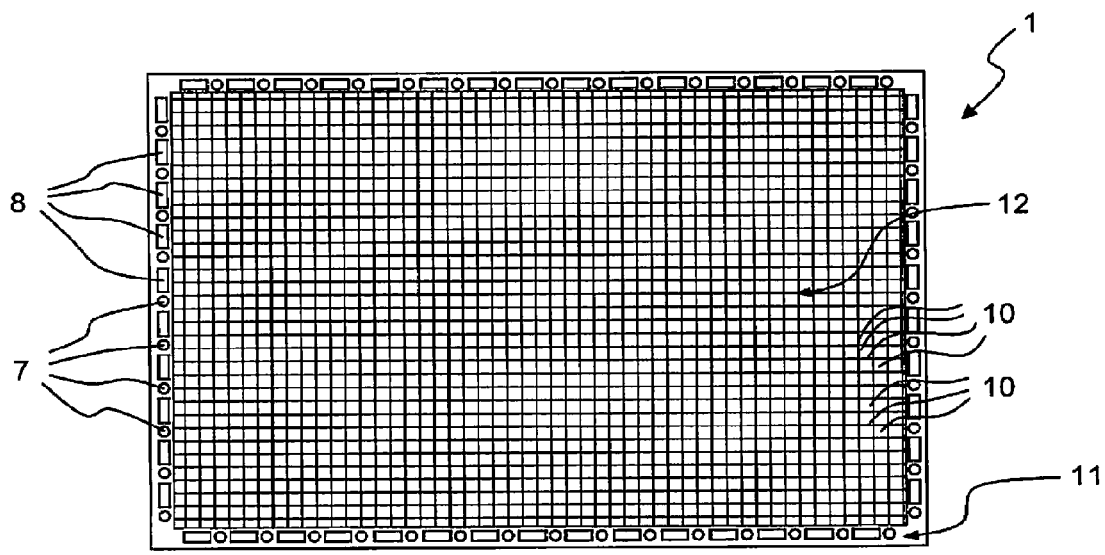
FIGS. 2A-2B are top plan and side views of an embodiment of the invention.
Figure 2B:
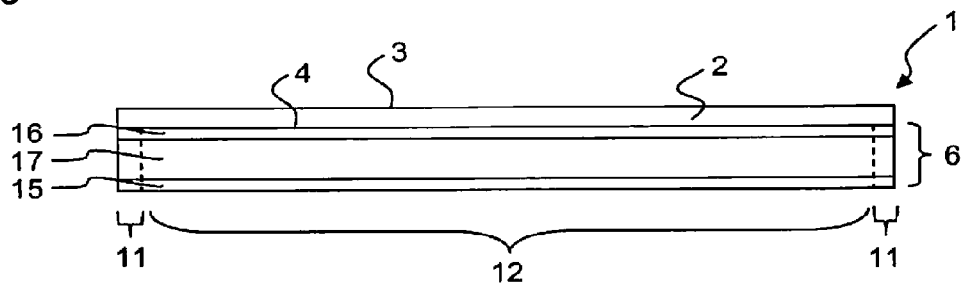

FIG. 2A is a top plan view and FIG. 2B is a side view of an FTIR system 1 according to an embodiment of the invention. The FTIR system 1 is implemented as a combination of a light transmissive panel 2 that defines a front touch surface 3, and a dual-function display unit 6 which is configured to both display images through the front surface 3 and provide touch sensitivity to the front surface 3 via FTIR.

As seen in the plan view of FIG. 2A, a plurality of emitters 7 and detectors 8 (collectively referred to as "touch-sensor elements") are arranged in interleaved fashion underneath a periphery portion of the panel 2. In the drawings, for illustrative purposes only, emitters 7 and detectors 8 are represented by circles and rectangles, respectively. Furthermore, a center portion of the panel 1 is aligned with a matrix of image-forming elements or picture elements ("pixels") 10 that define a display area for displaying visual images in monochrome or color. The pixels 10, which are indicated as a matrix of square elements in FIG. 2A, may be formed by any available integrated display technology, including but not limited to OLED (Organic Light-Emitting Diode), LED (Light Emitting Diode), LCD (Liquid Crystal Display) with internal illumination ("backlighting"), TFT-LCD (Thin Film Transistor Liquid Crystal Display), ELD (Electroluminescent Display), etc. Below, embodiments of the invention will be further exemplified with respect to OLED and TFT-LCD.

Embodiments of the invention are based on the insight that the emitters 7 and detectors 8 may be integrated into the display unit 6, and preferably be formed by the same technology as used for producing images in the display area. As used herein, an "integrated" emitter/detector 7, 8 is to be construed as an emitter/detector 7, 8 that is integrally formed on or in a substrate, which typically is a composite substrate comprising a plurality of layers. In FIG. 2B, the integration is indicated by dashed lines indicating that the display unit 6 is functionally (not physically) separated into a periphery region 11 with emitters 7 and detectors 8 and a center region 12 with pixels 10, where the emitters 7, detectors 8 and pixels 10 are integrally formed in a common substrate. That is, for example, the pixels 10, the emitters 7, and the detectors 8 form, or are formed from, a single integral structure.

Each emitter 7 is configured to generate a cone of light in any suitable wavelength region. In one embodiment, the emitter 7 generates light that is invisible to the human eye, e.g. in the infrared (IR) or ultraviolet (UV). Each detector 8 is configured to be responsive to the light emitted by emitters 7.

Compared to the prior art as described in the Background section, embodiments of the invention make is possible to provide touch sensitivity to a display apparatus essentially without adding to the thickness of the display apparatus. Furthermore, the manufacturing cost may be reduced since there is no need for a separate mounting operation for attaching emitters 7 and detectors 8. As will be further exemplified below, the emitters/detectors 7, 8 may be formed from functional structures also present in the display unit for the operation of the pixels 10. This means that the emitters 7 and detectors 8 may be manufactured by the same or a similar process as the pixels 10, whereby the added manufacturing cost may be minimal. It is also to be noted that the number of emitters 7 and detectors 8 that need to be added is comparatively small compared to the number of pixels of a typical display apparatus. For example, a 3.5" display may be provided with about $10-10^2$ emitters and detectors, while the number of pixels is typically on the order of about $10^5-10^6$. Still further, the touch sensitivity may be added without impairing the quality of images displayed in the display area, since the need to add touch-sensing layer(s) to the display area or integrate light detectors among the pixels within the display area is obviated.

Furthermore, by integrating the emitters/detectors 7, 8 at the periphery region 11 of the display unit 6, it is possible to omit separate contacting of the emitters/detectors 7, 8. Instead, they may be contacted and electronically controlled in the same way as the pixels 10. For example, a data bus structure or an electronics backplane for supplying control signals to the pixels 10, to selectively control the light emitted by the pixels 10, may also be used to supply control signals to the individual emitters 7 and detectors 8 and/or to retrieve output signals from the individual detectors 8.

FIG. 2A indicates that the periphery region 11 contains only emitters 7 and detectors 8, and thus is free of pixels 10. However, it is certainly possible to include pixels 10 also in the periphery region 11, if desired.

Figure 3:
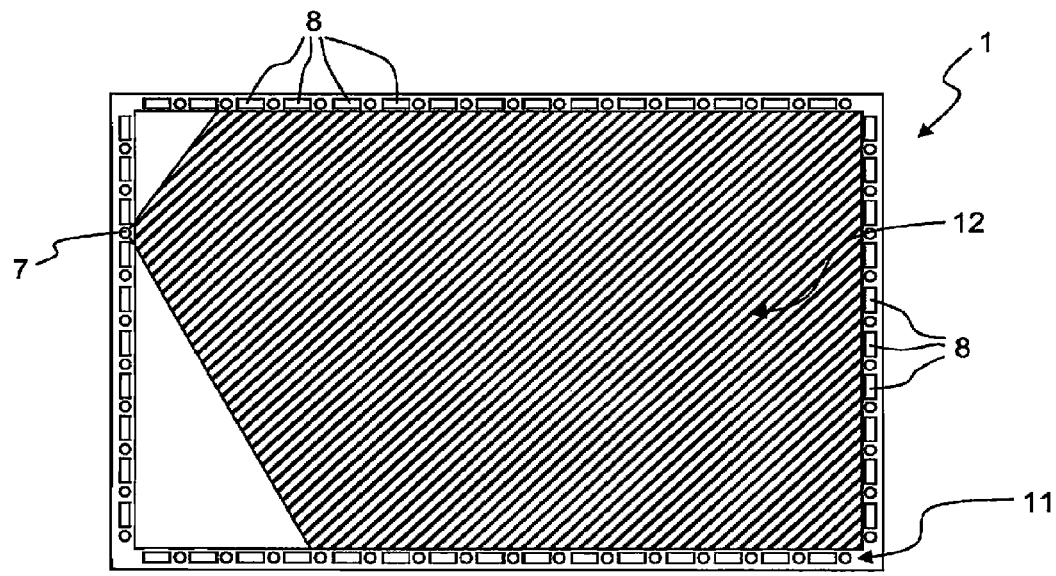
FIG. 3 is a top plan view of an embodiment with one activated emitter.

FIG. 3 is a top plan view to further illustrate the operation of the FTIR system 1. For reasons of clarity, the pixels have been omitted. As shown, one emitter 7 is activated to emit an expanding beam of light. The emitted beam, or at least part thereof, is coupled into the panel 2 such that it propagates by TIR across the touch surface 3, while expanding in the plane of the panel 2 away from the emitter 7 (a indicated by the hatched area). Such a beam is denoted a "fan beam" herein. Thus, each fan beam diverges from an entry or incoupling site, as seen on a top plan view. Downstream of the touch surface 3, the propagating light is coupled out of the panel 2 and received by a subset of the detectors 8. As noted above, a detection line is formed between the emitter 7 and each of the detectors 8 that receive the fan beam. It is realized that a large number of detection lines may be generated by activating each of the emitters 7 and measuring the power of received light at the detectors 8 for each emitter 7. Depending on implementation, the emitters 7 may be activated in sequence or concurrently, e.g. by implementing the coding scheme disclosed in WO2010/064983.

Reverting to FIGS. 2A-2B, the display unit 6 may be an optoelectronic device that makes use of organic materials for defining the pixels 10, emitters 7 and detectors 8. Examples of organic optoelectronic devices include organic light emitting devices (OLEDs), organic phototransistors, organic photovoltaic cells, and organic photodetectors. For further details regarding the structure and manufacture of organic optoelectronic devices, reference is made to WO2011/068761 and citations therein, all of which are incorporated herein by reference.

In the following, it is assumed that the display unit 6 in FIGS. 2A-2B is based on OLEDs. The display device 6 comprises a rear electrode (e.g. an anode) 15, and a front electrode (e.g. a cathode) 16, and an intermediate organic structure 17, which may be formed by one or plural organic layers, as is known in the art. The front electrode layer 16 is transparent and may e.g. be made of indium tin oxide (ITO). The pixels 10 of the display area may be defined by patterning of the electrode layers 15, 16, and optionally by patterning of the organic structure 17. Each pixel 10 may include one or more sub-pixels (not shown), which may be formed by selective doping to generate different light emissive properties of the different sub-pixels, e.g. such that the sub-pixels emit red, green and blue light, respectively.

The emitters 7 and detectors 8 in the periphery region 11 may be also defined by patterning of the electrode layers 15, 16 and/or by patterning of the organic structure 17. It is well-known that junction diodes, such as LEDs and OLEDs, are operable as both emitters and detectors by application of proper control voltages to the junction diodes. Thus, the emitters 7 and the detectors 8 may be implemented by the same or similar elements, whereby the emitters 7, the detectors 8 and the pixels 10 are formed as portions in the organic structure 17 that are selectively and individually addressable via the electrode layers 15, 16. In this embodiment, the combination of electrode layers 15, 16 and organic structure thus forms a composite substrate in which emitters 7, detectors 8 and pixels 10 are integrated.

The panel 2 may be a separate component that is attached to the display unit 6. Alternatively, the panel 2 is included as a transparent substrate during manufacture of the display unit 6, e.g. as a backing for supporting the front electrode 16. The interface between the display unit 6 and the panel 2 will be discussed in more detail with reference to FIG. 4 below.

The use of OLED technology makes it possible to design the display unit 6 as a thin and flexible unit, if desired. It is also possible to design the emitters 7 and the pixels 10 with different emissive properties, if desired. For example, the wavelength(s) at which the organic structure 17 emits light may be readily tuned with appropriate dopants during manufacture. Furthermore, the display unit 6 does not need to have a backlight. Still further, the size and shape of the pixels 10, emitters 7 and detectors 8 are readily set in manufacture. It may e.g. be advantageous make the emitters 7 and detectors 8 larger than the pixels 10. The amount of light emitted by an OLED element increases with its surface area, and it may thus be desirable to make the emitters 7 larger than the pixels 10 to increase the amount of emitted light from each emitter 7. OLEDs are known to have small heat losses, which enables the use of large emitters 7 without a need for additional cooling measures. The detectors 8 may also be made larger than the pixels 10 in order to improve the light gathering ability of the detectors 8. Another advantage of OLED technology is that OLEDs typically have a large index of refraction, e.g. 2-2.5, whereby light is emitted in a large solid angle, which may serve to favorably increase the divergence angle of the respective fan beam inside the panel 2 (cf. FIG. 3).

The simple layered structure illustrated in FIG. 2B is provided by way of non-limiting example, and it is understood that embodiments of the invention may be used in connection with a wide variety of other functional structures, including bottom or top emitting OLEDs, transparent OLEDs, stacked OLEDs, inverted OLEDs, fluorescent or phosphorescent OLEDs, active-matrix or passive-matrix OLEDs, etc.

Figure 4:
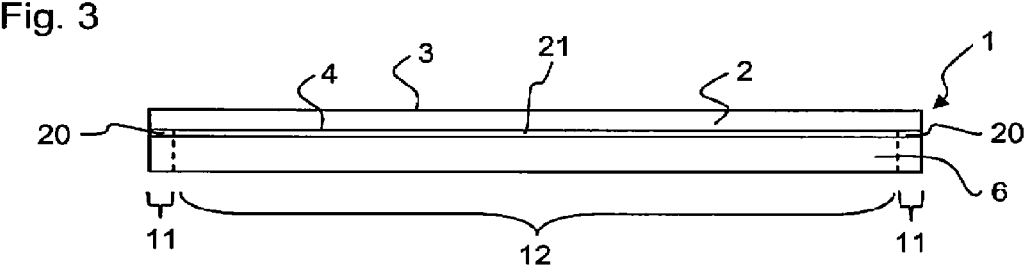
FIG. 4 is a side view of an embodiment including an OLED display unit.

FIG. 4 is a side view of an FTIR system 1 formed by attaching a light transmissive panel 2 to a display unit 6 e.g. as described in the foregoing. Generally, the panel 2 may be made of any material that transmits a sufficient amount of radiation in the relevant wavelength range to permit a sensible measurement of transmitted energy. Such material includes glass, poly(methyl methacrylate) (PMMA) and polycarbonates (PC). The panel 2 may be flat or curved and may be of any shape, such as circular, elliptical or polygonal. It is possible that the panel 2 is comprised of plural material layers.

The panel 2 may be bonded to the display unit 6 by means of an adhesive, such as an optical adhesive. In one embodiment, the panel 2 is laminated onto the display unit 6. To enable the light from the emitters 7 to be coupled into and out of the panel 2 at the periphery region 11, while enabling the light to propagate by TIR across the panel above the center region 12, different adhesives may be used in the periphery region 11 and the center region 12, as indicated by reference numerals 20, 21. Specifically, the adhesive 21 in the center region 12 may be selected to have an lower index of refraction lower than the panel 2, while the adhesive 20 in the periphery region 11 may be selected to have an index of refraction that is higher or substantially equal to the index of refraction of the panel 2.

In a variant, the panel 2 is attached by an adhesive 20 to the display unit 6 at the periphery region 11 only and arranged with an air gap 21 to the center region 12 of the display unit 6. It is currently believed that an air gap of at least about 2-3 µm is sufficient to enable propagation by TIR in the panel 2. This variant may facilitate removal and replacement of the panel 2 in the course of service and maintenance.

It is also conceivable that the panel 2 is attached to the display unit 6 via a spacer 20 of solid transmissive material. The spacer may be bonded to the panel 2 and the display unit 6, respectively, by thin adhesive layers, such that the coupling of light is controlled by the index of refraction of the spacer 20 rather than the adhesive. In analogy with the above, the spacer 20 may be located at the periphery region 11 only, or spacers 20, 21 with different index of refraction may be located at both the periphery region 11 and the center region 12.

As noted above, it is also conceivable that the panel 2 is formed by a transparent backing for the front electrode layer 16 (FIG. 4). It is realized that the process for manufacturing the display unit 6 may be adapted to add a layer of lower index of refraction between the electrode layer 16 and the transparent backing 2, if needed to sustain light propagation by TIR in the transparent backing 2.

The FTIR system 1 may also include structures configured to re-direct the light emitted by the emitters 7, e.g. to reshape the emitted cone of light so as to increase the amount of light coupled into the panel 2 in a desired fashion. For example, the emitted light may be redirected so as to form the fan beam in the plane of the panel 2, as shown in FIG. 3, and/or the emitted light may be redirected to increase the amount of light that is trapped by TIR in the panel 2. These light-directing structures may be included in the above-mentioned spacer 20, or the portion of the surface 4 that faces the periphery region 11 of the display unit 6, or the periphery region 11 of the display unit 6 itself. Similar light-directing structures may be included between the panel 2 and the detectors 8, so as to re-direct outcoupled light onto the detectors 8. Generally, the light-directing structures may be said to define the field of view of the emitter/detector 7, 8 inside the panel 2. The light-directing structures may be in the form of a micro-structured elements, such as prisms, gratings or holographic structures. The micro-structured elements may be printed, hot embossed, injection molded, pressure molded or otherwise provided between the emitters/detectors 7, 8 and the panel 2.

The light-directing structures may be omitted, whereby part of the emitted light will pass through the panel 2 without being trapped by TIR. Selected parts of the front surface 3 of the panel 2, e.g. above the periphery region 11, may be provided with a coating (not shown) to prevent such light from passing the front surface 3.

With or without light-directing structures, it may be desirable to implement stray light reduction measures. In one example, the edge surface of the panel 2 and/or the portion of the surface 3 above the periphery region 11 may be provided with surface structures that prevent light from the emitters from being reflected back into the panel 2. Useful anti-reflective surface structures include diffusors and light-absorbing coatings.

In a variant, surface structures are provided on the edge surface of the panel 2 and/or the portion of the surface 3 above the periphery region 11 to re-direct light from the emitters into the panel 2 for propagation by TIR. It is also possible that the edge surface is formed with a suitable bevel to re-direct the light. Such surface structures may include light-reflective coating(s) and/or micro-structured elements, and may implement or be part of the above-mentioned light-directing structures.

Figure 5:
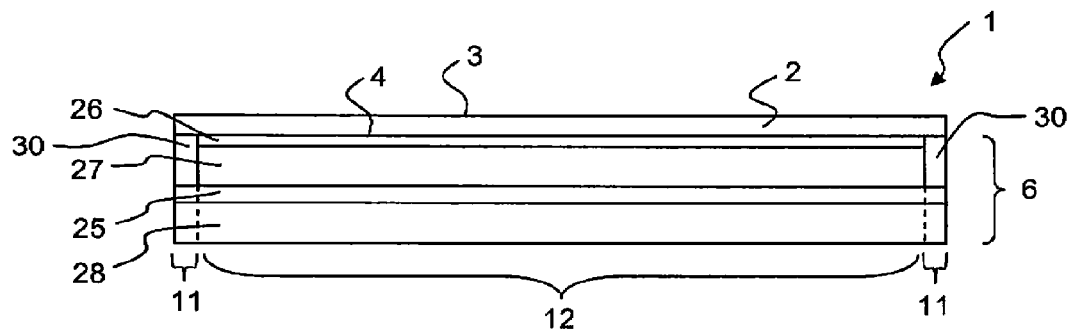
FIG. 5 is a section view of an embodiment including a TFT-LCD display unit.

FIG. 5 is a section view of an embodiment in which the display unit 6 is based on liquid crystal technology, and specifically with the display unit 6 being a TFT-LCD. The display unit 6 comprises a rear electrode layer 25, a front electrode layer 26 and an intermediate liquid crystal (LC) structure 27. The electrode layers 25, 26 are transparent and comprises a respective polarizer. The rear electrode layer 25 comprises a pixel-defining electrode structure and a TFT active matrix for pixel selection, whereby the polarization of the LC structure 27 may be selectively controlled (addressed) at the location of each pixel. The front electrode layer 26 may be implemented as a common electrode and may also comprise color filters, as is known in the art. In the illustrated embodiment, the display unit 6 further comprises a LED matrix backlight 28, which projects light for transmission through the electrode layers 25, 26 and the LC structure 27. Like in the foregoing embodiments, a light transmissive panel 2 is arranged to define a front touch surface 3. In the illustrated embodiment, the rear electrode layer 25 is designed with detectors in its periphery region 11. The detectors may e.g. be integrated as light-sensitive TFTs. Further details on TFT-LCDs and light-sensitive TFTs are e.g. found in WO2007/058924 and US2008/0074401, which are incorporated herein by reference. It may also be noted that the LC structure 27 preferably does not extend into the periphery region 11, in order to avoid that the liquid crystal obstructs the detection of the light that is coupled out of the panel 2. In the example of FIG. 5, the emitters are formed by dedicated LEDs in the periphery region 11 of the backlight 28. In this embodiment, the combination of backlight 28, electrode layers 25, 26 and LC structure 27 thus forms a composite substrate in which emitters 7, detectors 8 and pixels 10 are integrated. Further, a light-coupling element 30 is arranged to direct the light from the emitters to the panel 2 and from the panel 2 to the detectors. The light-coupling element 30 may or may not include the above-mentioned light-directing structures.

In an alternative embodiment (not shown), all or part of the emitters are integrated in the rear electrode layer 25, e.g. in the form of LEDs or light-emitting TFTs. In a further alternative embodiment (not shown), all or part of the detectors are integrated into the backlight 28, e.g. in the form of light-sensing LEDs or TFTs. In all of these embodiments, the backlight 28 may instead be implemented to illuminate the electrode layers 25, 26 and the liquid crystal structure 27 from the side, as is known in the art.

It is to be understood that the above discussion in relation to FIG. 4 is equally applicable to the embodiment in FIG. 5.

Figure 6:
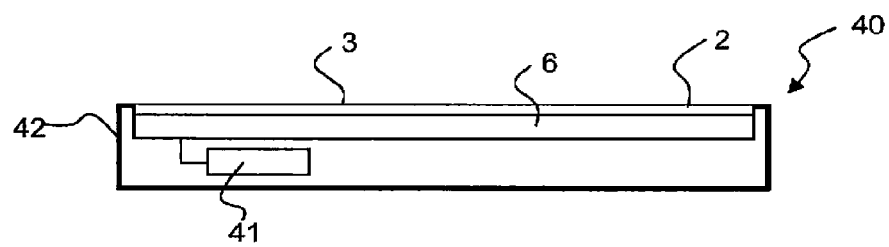
FIG. 6 is a section view of a touch-sensing display apparatus according to an embodiment.

FIG. 6 is a section view of a touch-sensing display apparatus 40, which comprises the display unit 6, the light transmissive panel 2 and a signal processor 41, which are arranged in an enclosure 42 such that the panel 2 forms a transparent front cover of the display apparatus 40. The signal processor 41 is a processing element (or means) which is connected to the display unit 6 so as to transmit control signals to the pixels, the emitters and the detectors, as well as to acquire output signals from the detectors. The signal processor 41 is also operable to generate and output touch data calculated based on the output signals. It is to be understood that the signal processor 41 may alternatively be implemented as a dedicated controller for the pixels and a dedicated controller for the emitters and the detectors.

It is to be understood that the display apparatus/display unity may form part of any form of electronic device, including but not limited to a laptop computer, an all-in-one computer, a handheld computer, a mobile terminal, a gaming console, a television set, etc. Such an electronic device typically includes a processor or similar controller that may be connected to control the display unit 6 to display information content within at least part of the touch surface 3 and to provide touch sensitivity within the touch surface 3. The controller may be implemented to control the display unit 6 via the signal processor 41, or it may implement part or all of the functionality of the signal processor 41.

While the invention has been described in connection with what is presently considered to be the most practical and preferred embodiments, it is to be understood that the invention is not limited to the disclosed embodiments, but on the contrary, is intended to cover various modifications and equivalent arrangements included within the spirit and the scope of the appended claims.

For example, it is conceivable that only the detectors 8 are integrated in the display unit 6, while the emitters 7 are otherwise installed in the display apparatus 40, e.g. as separate components. Likewise, it is conceivable that only the emitters 7 are integrated in the display unit 6, while the detectors 8 are otherwise installed in the display apparatus 40, e.g. as separate components.

In certain embodiments, the display unit 6 may comprise only one emitter 7 in combination with plural detectors 8, or only one detector 8 in conjunction with plural emitters 7. It is even conceivable that the display unit 6 has only one emitter 7 and one detector 8, e.g. to detect the presence of a touching object 5 on the touch surface 3.

Although it may be preferable that the emitter(s) 7 and the detector(s) 8 are implemented by the same technology as used for generating images in the display area, e.g. to have similar functional structure as the pixels 10, it is also possible that the detector(s) 7 or the emitter(s) 8, or both, are implemented by a different technology when integrated into the display unit 6.

As noted above, it may be desirable that the surface area of the emitters and detectors is larger than the surface area of the pixels. It is to be understood that the emitters may be larger than the detectors, and vice versa, and also that the emitters and detectors may have any shape, including circular, elliptical, and polygonal.

The invention claimed is:

1. A touch-sensing display apparatus, comprising:
a display unit comprising integrated elements;
a planar light guide located in front of the display unit, so as to define a touch surface;
at least one light emitter arranged to emit light into the light guide for propagation by total internal reflection inside the light guide; and
at least one light detector arranged to receive at least part of the light propagating inside the light guide;
wherein the integrated elements comprise image-forming elements and touch-sensor elements,
wherein the touch-sensor elements comprise at least one of said at least one emitter and said at least one detector and are arranged along a periphery region of the display unit, and
wherein the image-forming elements and the touch-sensor elements together form a single integral structure in which the image-forming elements are only functionally separated from the touch-sensor elements.

2. The touch-sensing display apparatus of claim 1, wherein the image-forming elements and the touch-sensor elements are integrated in one and the same composite substrate within the display unit.

3. The touch-sensing display apparatus of claim 1, wherein the touch-sensor elements are formed from functional structures also present in the display unit for the operation of the image-forming elements.

4. The touch-sensing display apparatus of claim 3, wherein the functional structures comprise at least one of an organic optoelectronic device, an OLED, a TFT, and an LED.

5. The touch-sensing display apparatus of claim 1, wherein the display unit comprises a common electrode arrangement which is connected to both the image-forming elements and the touch-sensor elements.

6. The touch-sensing display apparatus of claim 1, wherein the periphery region is located at a perimeter of a center region of the display unit, said center region comprising said image-forming elements.

7. The touch-sensing display apparatus of claim 1, wherein the image-forming elements are located only in a center region.

8. The touch-sensing display apparatus of claim 1, wherein the touch-sensor elements comprise said at least one emitter and said at least one detector.

9. The touch-sensing display apparatus of claim 8, wherein the light guide is arranged in contact with at least part of the display unit, such that light is coupled between the light guide and the touch-sensor elements.

10. The touch-sensing display apparatus of claim 9, wherein the light guide is attached to the periphery region of the display unit.

11. The touch-sensing display apparatus of claim 9, wherein the light guide is attached to the image-forming elements by a first material and to the touch-sensor elements by a second material, wherein the first material is configured to sustain the total internal reflection inside the light guide and the second material is configured to couple light between the light guide and the touch-sensor elements.

12. The touch-sensing display apparatus of claim 9, wherein an air gap is defined between the light guide and the image-forming elements of the display unit.

13. The touch-sensing display apparatus of claim 1, wherein the light guide is attached to the display unit by lamination.

14. The touch-sensing display apparatus of claim 1, wherein the light guide comprises a front cover of the touch-sensing display apparatus.

15. The touch-sensing display apparatus of claim 1, wherein the light guide is formed by a transparent substrate integrated with a top electrode layer of the display unit.

16. The touch-sensing display apparatus of claim 1, further comprising a light-redirecting structure configured to define a field of view of the touch-sensor elements.

17. The touch-sensing display apparatus of claim 16, wherein the light-redirecting structure is included in at least one of the touch-sensor elements, the light guide and a contact material between the periphery region and the light guide.

18. The touch-sensing display apparatus of claim 1, further comprising a surface structure on a periphery portion of the light guide for preventing impinging light from being reflected back into the light guide.

19. The touch-sensing display apparatus of claim 1, wherein the display unit comprises one or more intermediate organic layers between a first electrode layer and a second electrode layer, wherein the image-forming elements and the touch-sensor elements are formed as selectively addressable portions in said one or more organic layers.

20. The touch-sensing display apparatus of claim 1, wherein the display unit comprises a liquid crystal structure between a first electrode layer and a second electrode layer, the first electrode layer comprising a two-dimensional array of thin-film transistors, wherein at least part of the touch-sensor elements are formed by a subset of the thin-film transistors.

21. The touch-sensing display apparatus of claim 20, wherein the display unit further comprises a backlight for illuminating the liquid crystal structure through the first and second electrode layers, wherein at least part of the touch-sensor elements are integrated in the backlight.

22. The touch-sensing display apparatus of claim 20, wherein the periphery region is located outside a perimeter of the liquid crystal structure.

23. The touch-sensing display apparatus of claim 1, wherein a surface area of each touch-sensor element is larger than a surface area of each image-forming element.

24. The touch-sensing display apparatus of claim 1, further comprising a signal processor configured to process an output signal from said at least one light detector so as to determine touch data for one or more objects in contact with the touch surface, said one or more objects thereby attenuating the light propagating inside the light guide.

25. An electronic device comprising the touch-sensing display apparatus of claim 1, and a controller for causing the image-forming elements to display information content within at least part of the touch surface while causing the touch-sensor elements to provide touch sensitivity within said at least part of the touch surface.

* * * * *